United States Patent [19]
Sitton et al.

[11] Patent Number: 4,833,816
[45] Date of Patent: May 30, 1989

[54] SUPER SETTER PLASTIC FISHING HOOK

[75] Inventors: Gary L. Sitton, P.O. Box 3543, Beaumont, Tex. 77704; Albert M. Mitchell, Houston, Tex.

[73] Assignee: Gary L. Sitton, Beaumont, Tex.

[21] Appl. No.: 483,719

[22] Filed: Apr. 11, 1983

[51] Int. Cl.$^4$ ............................................. A01K 83/00
[52] U.S. Cl. ................................................. 43/43.16
[58] Field of Search ................... 43/43.16, 15, 5, 53.3, 43/28

[56] References Cited

U.S. PATENT DOCUMENTS

| | | | |
|---|---|---|---|
| 356,499 | 1/1887 | Pennell | 43/43.16 |
| 824,594 | 1/1907 | Van Vleck | 43/43.16 |
| 1,313,372 | 8/1919 | Dodge | 43/ |
| 2,180,577 | 11/1939 | Skoverski | 43/28 |
| 2,511,117 | 6/1950 | Loeb | 43/42.37 |
| 2,531,981 | 11/1950 | Liebe | 43/43.16 |
| 2,539,735 | 1/1951 | Forsyth | 43/43.16 |
| 2,624,146 | 1/1953 | Kahle | 43/43.16 |
| 2,865,131 | 12/1958 | Ellis | 43/43.16 |
| 3,399,482 | 9/1968 | Cox | 43/15 |
| 3,755,954 | 9/1973 | Lucius | 43/43.16 |
| 4,126,957 | 11/1978 | Randell | 43/43.16 |

FOREIGN PATENT DOCUMENTS 1204223  9/1970  United Kingdom ............... 43/43.16

Primary Examiner—Kurt Rowan
Attorney, Agent, or Firm—Vaden, Eickenroht, Thompson & Boulware

[57] ABSTRACT

A monolithic molded plastic fishing hook connectable to a monofilament fishing line. The hook by its unique parts is arranged to provide a shock absorber action during catching fish, to release from a hooked snag before the line breaks, and to maintain the axis of penetration of the barbed point substantially parallel to the line of action under near maximum line pull.

12 Claims, 1 Drawing Sheet

SUPER SETTER PLASTIC FISHING HOOK

BACKGROUND OF THE INVENTION

1. Field of the Invention

This invention relates to the field of fishing, and it more particularly relates to a unique fishing hook.

2. Description of the Prior Art

The art of fishing using a line and hook is ancient. Multitudes of hooks have been used and constructed from materials ranging from carved bones, metals and even modern plastics. In most cases, the design of the hook was an overkill, i.e., the hook was the strongest part of the fishing system. Naturally, this design concept has caused many a fisherman to loose his tackle by hooking a snag. A strong pull by the fisherman, if it did not retrieve the snag, usually led to the line breaking somewhere along its length.

The design of the hook has been to prevent bending or uncurving of the bent part which connects the barbed point to the body secured to the fishing line. Although hooks have been proposed with flexible bends, they always prevented straightening and insured an inwardly curved motion to insure better hook setting results. Naturally, a self setting hook always holds the tightest to a snag, etc.

It has been found that a strong rigid hook i.e., a heavy steel hook, does not always insure a hooked fish, even a fish that strikes very hard. The rigid hook causes a tensioning effect on the fishing line and unless its barbed point drives clearly home in the cartilage of the fishes mouth, slight slippage of the point causes the hook to "spring" from the mouth and results in a lost fish. Thus, a hook that has a shock absorber action in firmly but not rigidly pressing the barbed point in the fishes mouth would be better than a cast iron-rigid hook. Also, this spring action allows "less-tear" in the fishes mouth which is particularly important when releasing a caught fish or if one "gets off the line".

It is the purpose of this invention to provide a unique fishing hook that releases from a snag before breaking the fishing line but yet "hooks" a fish better than steel hooks.

SUMMARY OF THE INVENTION

In accordance with this invention, there is provided a unique fishing hook formed of a monolithic molded member. The hook has an elongated body of uniform cross sectional area with at one end a connection part for receiving the fishing line. A looping reverse curved part connects the body at its other end with a barbed point. The barbed point penetrates encountered animal forms in the direction of the connection part. The barbed point in the relaxed state has a penetration axis inclined at a small angle to the line of action of the body, but the axis is in a plane common to the body. The looping curved part has a cross sectional area not greater than the body, and these areas are adjusted in relative beam strength whereby the penetration axis of the barbed point is deflected outwardly to near parallel to the line of action on the body when the line pulling forces approach about 85% of the total line pulling force to straighten out the looping curved part so as to release the barbed point from an engaged object.

In the preferred embodiment, the small angle of the barbed point is about 4 degrees and the barbed point is of the nail point type.

DESCRIPTION OF THE DRAWINGS

In these drawings, the several embodiments have common elements in the present fishing hook. In regard to these figures, like elements will carry like reference numerals to simplify description of the present invention in fishing hooks.

DESCRIPTION OF PREFERRED EMBODIMENTS

Figure 1:
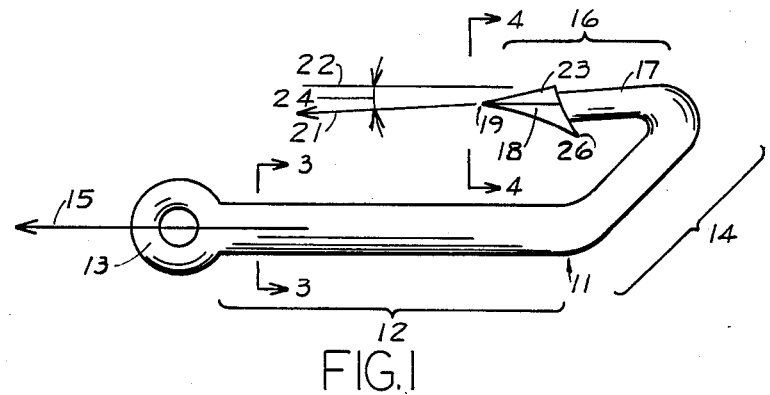
FIG. 1 is an elevation showing the preferred embodiment of the present fishing hook.
Figure 2:
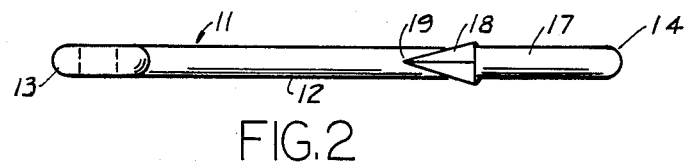
FIG. 2 is a plan of this fishing hook.

Referring to FIGS. 1 and 2, there is shown a fishing hook 11 constructed in accordance with the present invention. The hook 11 is a monolithic molded plastic member which can be formed in metal dies under high pressure and temperature molding from thermoplastics such as Xytel 330 or Rynite 35S, both trademarks of Dupont plastics. For example, the hook 11 can be molded at 550° F. and 8000 psi conditions in steel cavity molds.

The hook 11 although monolithic, has a unique shape and cross sectional relationship between its several parts to produce the novel results priorly listed and more fully discussed hereinafter.

Figure 3:
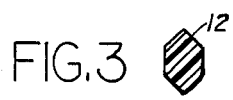
FIGS. 3 and 4 are a cross section and an end view along lines 3—3 and 4—4, respectively, of the fishing hook shown in FIG. 1.
Figure 4:
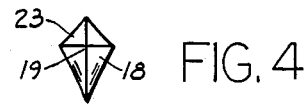

The hook 11 has a body 12 of uniform cross sectional area. Although the cross section of the body 12 may be of any structural shape capable of producing the desired results, it is preferred that the cross sectional shape be ellipsoidal, as is shown by reference in FIG. 3. The body 12 with this uniform cross sectional shape provides an elastic beam which can deflect between its ends to a uniform curvature upon being subjected to a load proportional to its bending movement.

An eye 13 is formed at one end of the body 12, and a fishing line can be attached to it. The pulling force of this line acts along a line-of-action 15 passing longitudinally through the body 12. Naturally, this acting force on the hook 11 produces both the bending movement and tension across the body 12.

The body 12, at its other end remote from the eye 13 connects with a looping curved part 14 that forms a reverse curved shape and connects to a barbed point 16. The part 14 has a uniform cross sectional shape like the body 12, but its cross sectional area is not as great as the body. There is a preferred relationship between these cross sectional areas of these parts that will be described hereinafter. If great force is applied, the curved part 14 will straighten-out sufficiently to release the barbed point 16 from the object.

The barbed point 16 has a shank 17 connected with the curved part 14 and an end formed into a head 18 ending at a sharp point 19. The shank 17 preferably has an ellipsoidal cross sectional shape but is smaller in area than the adjacent end of the curved part 14. In the relaxed state the barbed point 16 has penetration axis 21 extending lengthwise from the sharp point 19, through the shank 17 into the end of the curved part 14. The penetration axis 21 resides in a plane common to the body and curved part but it is inclined at a small angle 24 to the line-of-action 15 passing longitudinally through the body 12. Good results are obtained when this small angle 24 is less than 7.5 degrees, and best results occur with the small angle 24 about 4 degrees.

It will be apparent that the hook 11 molded as a thermoplastic member has certain flexural properties. As the pull of the fishing line increases along the line-of-action 15, the barbed point 16 will exert a counter force on a hooked object such as a fish. The barbed point 16 is deflected outwardly decreasing the small angle 24 towards zero. The cross sectional areas of the body 12, curved part 14 and barbed point 16 are adjusted in relative beam strength that the small angle 24 becomes zero when the fishing line pulling force approaches about 85-90 percent of the total pulling force along the line-of-action 15 to straighten out the curved part 14 and release the barbed point 16 from the engaged object. This relationship of cross sectional areas, for this unique result, can be defined by complex mathematical relationships but they can be as easily determined by cut-and-try testing of the hook 11 and then adjusting the cross sectional area relationships.

As the barbed point 16 becomes parallel to the line-of-action 15, its penetration ability on fish members (flesh and cartilage) reaches an optimum. Thus, the heavier fish on a given hook construction will get the best penetration by the barbed point 16.

The head 18 should be designed to not only give good penetration performance, but only to lock into the fish when penetration is effected. Good results are obtained when the head is formed as a nail point type with several plane or concave surfaces 23 merging at the point 19. Preferably, the inward ends of the surfaces 23 extend beyond and below (as at 26) with shank 17. Thus, once the head 18 passes through the flesh, the outwardly extending surfaces prevent withdrawal of the barbed point 16.

Figure 6:
FIGS. 5 and 6 are elevational and end views, respectively, of an alternate barbed point used on the fishing hook shown in FIG. 1.
Figure 5:
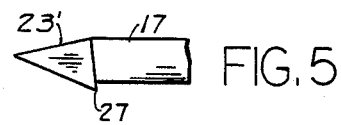

If desired, the head 18 can be of other design types, such as the pyramidal shape shown in FIGS. 5 and 6 on the head 18'. In this construction, the head 18' has trapazoidal arranged flat surfaces 27 merging to point 18' and with the inward surfaces 28 extending below the shank 17 to form the flesh lock function.

Preferably, the hook 11 is constructed so that for a given fishing line strength, the curved part 16 will deflect or straighten out at a magnitude of fishing line pull of 90-95 percent of the test breaking strength of the line. For example, a 15 pound test nylon monofilament fishing line is to be used with the hook 11. In this case, the curved part 14 will deflect to release the barbed point 16 at about 13.5 pounds pull on the hook 11. For this hook 11, the barbed point 16 is deflected into parallel with the line-of-action 15 when the line pulling force is about 11 pounds. With this arrangement of the hook 11, it will catch fish efficiently of the magnitude on 15 pound test line in a sportsmanlike manner. If a limb or other snag is snaired or hooked, the hook 11 can be pulled free, and there is no loss of equipment through broken tackle, line or hook which quickly reassumes its relaxed state shape shown in FIGS. 1 and 2.

Figure 7:
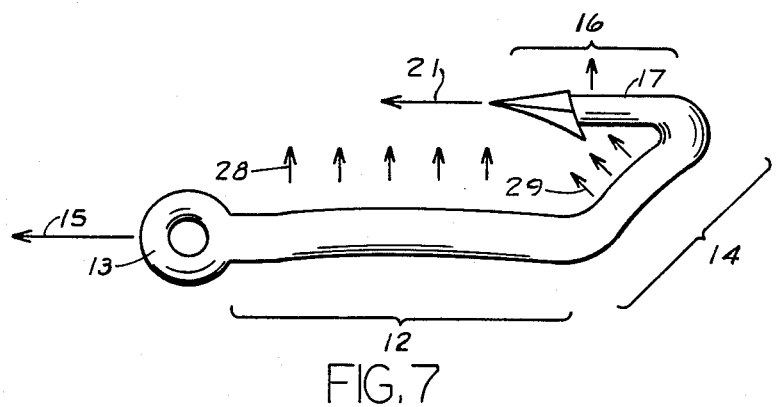
FIG. 7 illustrates the beam loading effects upon the fishing hook of FIG. 1 for maximum penetration by its barbed point.

The functioning of the hook 11 can be understood by viewing FIG. 7. The hook 11 is shown with the barbed point 16 secured with the point 19 against a restraint surface (not shown). The line pull along the line-of-action 15 is of a magnitude to reduce the small angle 24 to zero and the penetration line 21 falls on the line 22.

At this condition the body 12 as an elastic beam, assumes a uniform radius of curvature through lateral deflection indicated by the arrows 28. Likewise, the curved part 14 is bent into a slightly greater curvature through lateral deflection indicated by the arrows 29. It will be apparent that this deflection of the body 12 and curved part 14 is induced flexture by design relationship of the respective cross sectional areas (i.e., their bending movements).

If the line force were varied, as by a fighting fish, the hook 11 responds by variations in beam flexture which is a shock absorber function. As a result of this function, the barbed point 16 is held with its point 19 against the encountered surface and does not tend to slip loose as does a hard, less resilient steel hook.

It will be apparent that a superior performing hook 11 is described, but also a hook that can be designed to pull free of a snag, etc., at some line pull less than the tensile strength of the fishing line. Then, the hook 11 snaps-back to its relaxed state shape ready for a new fishing encounter.

Importantly, the present hook 11 becomes an integrated part of the fishing system for novel results as compared to the strongest part (overkill) design of the conventional fishing hook made of metal.

Although the hook 11 is shown with an eye to receive the fishing line, the connection can be provided by a socket or even an adhesive or thermoweld connection to the fishing line.

From the foregoing, it will be apparent that there has been provided a novel hook for fishing. It will be appreciated that certain changes or alterations in the present hook may be made without departing from the spirit of this invention. These changes are contemplated by and are within the scope of the appended claims which define the invention. Additionally, the present description is intended to be taken as an illustration of this invention.

What is claimed is:

1. A fishing hook formed as a monolithic molded plastic member, said hook comprising;
    (a) an elongated body of uniform cross sectional area having a line of action extending longitudinally therethrough;
    (b) a connection part adapted to connect with a fishing line at one end of said body;
    (c) a looping curved part forming a reverse curve connecting said body to a barbed point;
    (d) said barbed point adapted for penetration of an encountered animal form in the direction of said connection part;
    (e) said barbed point in the relaxed state having a penetration axis inclined at a small angle to the line of action of said body, and said penetration axis residing substantially in a plane common to said body;
    (f) said looping curved part having a cross sectional area not greater than said body;
    (g) said cross sectional areas of said body and said looping curved part adjusted in relative beam-strength whereby said penetration axis of said barbed point is deflected outwardly to near parallel to the line of action on said body when the line pulling force at said connection part approaches about 85% of the total line pulling force required to straighten out said looping curved part and release said barbed point from an engaged object such as an animal form.

2. The fishing hook of claim 1 wherein element (e), said small angle is about 4 degrees.

3. The fishing hook of claim 1 wherein element (e) said barbed point has a nail point type with an inwardly concaved curbed barb portion facing said looping curved part.

4. The fishing hook of claim 1 wherein said hook is a molded member of Xytel 330 plastic.

5. The fishing hook of claim 1 wherein said hook is a molded member of Rynite 35S plastic.

6. A fishing hook formed as a monolithic molded plastic member, said hook comprising:
 (a) an elongated body of uniform cross sectional area having a line of action extending longitudinally therethrough;
 (b) a connection part adapted to connect with a fishing line at one end of said body;
 (c) a looping curved part forming a reverse curve connecting said body to a barbed point;
 (d) said barbed point adapted for penetration of an encountered animal form in the direction of said connection part;
 (e) said barbed point in the relaxed state having a penetration axis inclined at a small angle to the line of action of said body, and said penetration axis residing substantially in a plane common to said body;
 (f) said looping curved part having a cross sectional area not greater than said body;
 (g) said cross sectional areas of said body and said looping curved part adjusted in relative beam-strength whereby said penetration axis of said barbed point is deflected outwardly to near parallel to the line of action on said body; and wherein said body flexes inwardly toward said barbed point, said body flexure providing a resilient cushion to maintain said barbed point and said penetration axis parallel to the line of action of said body when the line pulling force at said connection part approaches about 85% of the total line pulling force required to straighten out said looping curved part and release said barbed point from an engaged object such as animal form.

7. The fishing hook of claim 1 wherein element (g), said line pulling force required to straighten out said looping curved part to release said barbed point is less than the tensile strength of the fishing line secured to said connection part.

8. The fishing hook of claim 1 wherein said barbed point has a pyramidal shape with flat inclined side surface.

9. A fishing hook formed as a monolithic molded plastic member, said hook comprising:
 (a) an elongated body of uniform cross-sectional area having a line-of-action extending longitudinally therethrough;
 (b) a connection part adapted to connect with a fishing line at one end of said body;
 (c) a substantially straight portion formed at an obtuse angle with respect to said body, having a uniform cross sectional area not greater than said body and connecting said body to a barbed point;
 (d) said barbed point adapted for penetration of an encountered animal form at the direction of said connection part;
 (e) said barbed point in a relaxed state having a penetration axis inclined at a small angle to said line-of-action of said body, and said penetration axis residing substantially in a plane common to said body and said straight portion;
 (f) said cross sectional areas of said body and said straight portion adjusted in relative beam strength whereby said penetration axis of said barbed point is deflected outwardly to near parallel to the line-of-action on said body when the line pulling force at said connection part approaches about 85% of the total line pulling force required to deflect said straight portion to near parallel to said line-of-action of said body, thereby releasing said barbed point from an engaged object such as an animal form.

10. The fishing hook of claim 9, wherein in element (e) said small angle is about 4°.

11. The fishing hook of claim 9, wherein in element (f) the line pulling force required to deflect said straight portion to near parallel to the line-of-action of said body and to release said barbed point is less than the tensile strength of the fishing line secured to said connection part.

12. The fishing hook of claim 9, wherein said body and said straight portion flex inwardly toward said barbed point and the flexure thereof providing a resilient cushion to maintain said barbed point and said penetration axis parallel to said line-of-action of said body as the line pulling force on the hook approaches about 85% of the total line pulling force required to deflect said straight portion towards said near parallel to the line-of-action of said body.

* * * * *